(12) United States Patent
Kirk et al.

(10) Patent No.: US 8,561,122 B2
(45) Date of Patent: Oct. 15, 2013

(54) VIDEO TEST PROCESS INTEGRATED IN A SET-TOP-BOX

(75) Inventors: Colum H. Kirk, Chantilly, VA (US); David Taiyung Kao, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1111 days.

(21) Appl. No.: 12/199,310

(22) Filed: Aug. 27, 2008

(65) Prior Publication Data

US 2010/0053337 A1    Mar. 4, 2010

(51) Int. Cl.
  *H04N 17/00*   (2006.01)
  *H04N 17/02*   (2006.01)
  *H04N 3/22*    (2006.01)
  *H04N 7/16*    (2011.01)

(52) U.S. Cl.
  USPC ........... 725/140; 348/181; 348/189; 348/192; 348/745

(58) Field of Classification Search
  USPC .......................... 348/180–181, 189–192, 745
  See application file for complete search history.

(56) References Cited

U.S. PATENT DOCUMENTS

| | | | |
|---|---|---|---|
| 5,247,350 A * | 9/1993 | Meyer et al. | 348/189 |
| 5,671,011 A * | 9/1997 | Kim | 348/189 |
| 5,798,788 A * | 8/1998 | Meehan et al. | 348/180 |
| 6,438,212 B1 * | 8/2002 | Lysaght et al. | 379/21 |
| 6,741,277 B1 * | 5/2004 | Rau | 348/181 |
| 7,369,159 B2 * | 5/2008 | Somers | 348/181 |
| 2003/0156229 A1 * | 8/2003 | Samman et al. | 348/745 |
| 2004/0240676 A1 * | 12/2004 | Hashimoto et al. | 381/56 |
| 2007/0083888 A1 * | 4/2007 | Liebhold | 725/37 |

OTHER PUBLICATIONS

"HQV—Hollywood Quality Video Processing for HD : Benchmark DVD", http:hqv.com/benchmark.cfm, printed Aug. 27, 2008 (2 pages).

* cited by examiner

*Primary Examiner* — Hai V Tran

(57) ABSTRACT

A device, such as a set-top box, may include logic to allow television customers to automatically test and adjust the quality of the displayed video signal. A set-top box may receive a user selection of whether to perform a video test using an automatic loopback test sequence or a user subjective test sequence. The set-top box may perform, when the automatic loopback test sequence is selected, a video quality test that may include transmitting a signal from the set-top box, receiving a loopback version of the video signal, and comparing the received loopback version of the video signal to the transmitted signal. The set-top box may perform, when the user subjective test sequence is selected, a video quality test that may include displaying one or more test patterns to a user and receiving feedback from the user relating to a quality of the displayed test patterns.

22 Claims, 5 Drawing Sheets

VIDEO TEST PROCESS INTEGRATED IN A SET-TOP-BOX

BACKGROUND INFORMATION

In an increasingly digitally connected world, telecommunication services play a crucial role in the daily operation of businesses and in consumers' lives. Telecommunication services commonly used by both businesses and consumers include telephone, network (e.g., Internet) connectivity, and television. These services are typically provided to the customer premises by a telecommunication provider through one or more wired or wireless connections.

Television, in particular, is one service that may be provided to consumers. Typically, incoming television signals are received by a signal processing device, such as a set-top-box (STB) or television tuner card, before being forwarded to the consumer's audio/video equipment. It is, of course, desirable that the quality of the signal output on the final consumer device (e.g., an HDTV) is as high as possible given the audio/video equipment being used by the consumer.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein allow television consumers to automatically test and adjust the quality of a received video signal. In one implementation, a set-top box provides automatic video loopback testing to potentially fine tune the video signal seen by the consumer. Additionally, in some implementations, the set-top box may also provide testing patterns that the consumer can use to subjectively evaluate and adjust the quality of the video signal. The video testing processes described herein may be particularly useful in situations in which the consumer connects additional audio/video equipment to the set-top box.

Figure 1:
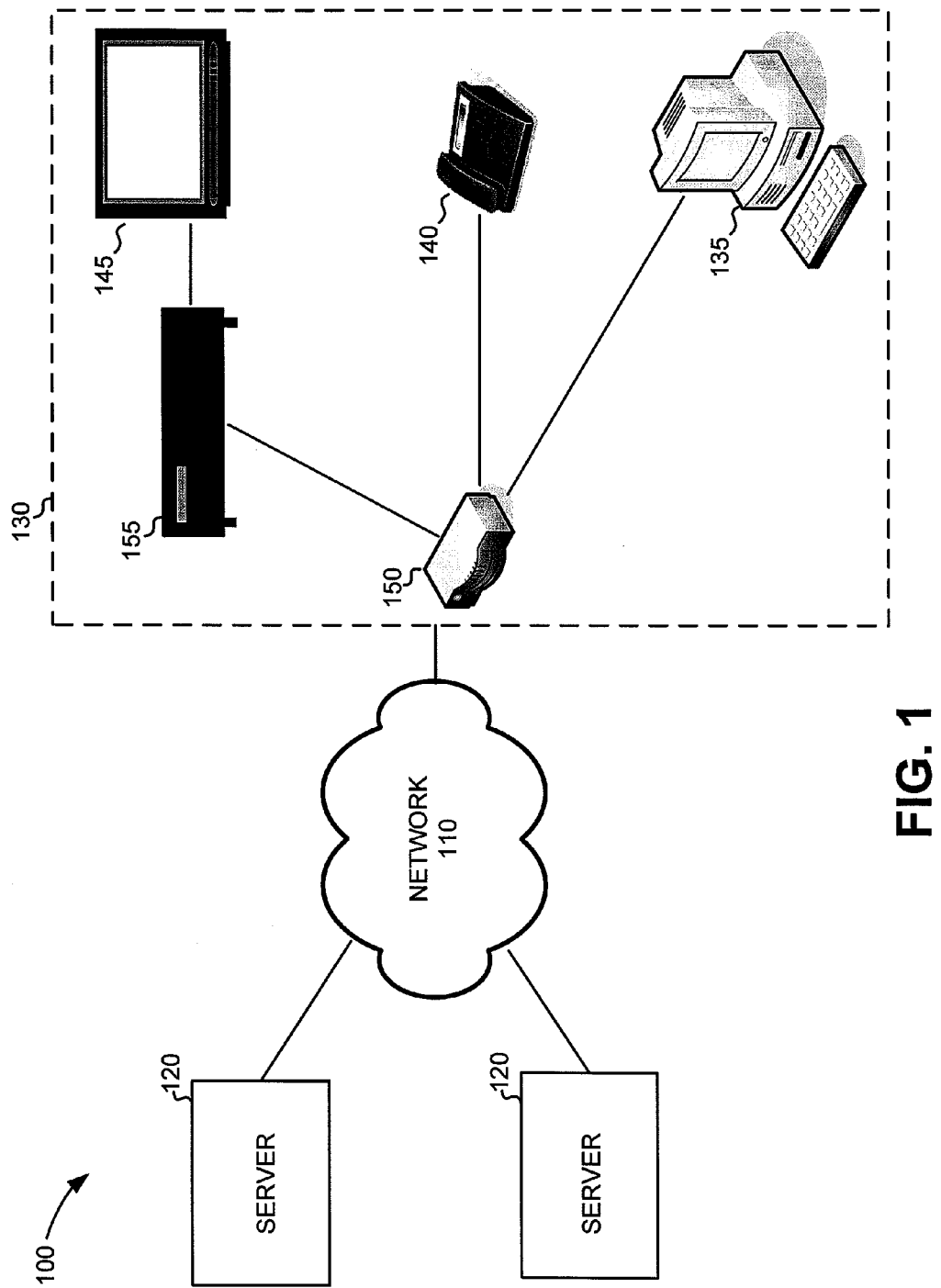
FIG. 1 is a diagram of an exemplary system in which concepts described herein may be implemented.

FIG. 1 is a diagram of an exemplary system 100 in which concepts described herein may be implemented. As illustrated, system 100 may include a network 110 that connects one or more server devices 120 to a consumer/customer premises 130. In general, server devices 120 may provide or control, via network 110, telecommunication services such as telephone, television, and/or network connectivity (e.g., Internet) to customer premises 130.

Network 110 may include a Local Area Network (LAN), a wide area network (WAN), such as a cellular network, a satellite network, a broadcast television based network, the Internet, a private WAN, or a combination of the Internet and a private WAN, that is used to transport data. Although shown as a single element in FIG. 1, network 110 may include a number of separate networks that function to provide services to customer premises 130. In one implementation, network 110 may terminate at customer premises 130 via an optical communication link, such as an optical fiber to the customer premises. In another possible implementation, network 110 may terminate at customer premises 130 via a coaxial cable or other types of wired mechanisms. In yet another possible implementation, network 110 may represent over-the-air television broadcast channels that provides content to customer premises wirelessly.

Server devices 120 may include servers or other network devices used to deliver or control delivery of the telecommunication services to customer premises 130. For example, server devices 120 may include web servers, network switches or routers, television broadcast facilities. etc.

Customer premises 130 may include a number of electronic devices, such as computing device 135, telephone 140, and television 145. Customer premises 130 may additionally include devices that provide an interface to personal computer 135, telephone 140, and television 145, such as a local gateway 150 and a set-top box (STB) 155.

Computing device 135 may include, for example, a personal computer, such as desktop, laptop computer, personal digital assistant (PDA), etc., used for general computing tasks.

Telephone 140 may include standard analog phones or VoIP (voice over IP) phones. As a VoIP phone, telephone 140 may be a stand-alone telephone capable of initiating VoIP calls over network 110 or a "soft-phone" that is implemented as software on computing device 135.

Television 145 may include a digital or analog television through which a user may watch programming. For example, television 145 may include a high-definition television (HDTV) set.

Gateway 150 may include a network device that provides an interface from network 110 to personal computer 135, telephone 140, and television 145. For example, when telecommunication services are provided to customer premises 130 via optical fiber, gateway 150 may include an optical network terminal (ONT) to connect to the optical fiber. The ONT may convert between signals appropriate for devices 135/140/145/155 and signals appropriate for transmission over optical fiber. For example, the ONT may include an Ethernet output port that connects to personal computer 135, a VoIP telephone 140, a standard telephone port for connecting to a standard telephone 140, and/or a coaxial cable that connects to television 145 or STB 155.

STB 155 may include a device for selecting and/or obtaining content that may be shown or played on television 145. STB 155 may receive a television signal from gateway 150, convert the signal to a form usable by television 145, and transmit the signal to television 145 for display. STB 155 may receive commands, such as commands transmitted via a remote control, and control television 145 accordingly. STB 155 may also be capable of sending data to server devices 120. For example, users may use a remote control or wireless keyboard to interact with STB 155 and television 145 in an interactive session.

In general, customer premises 130 may be either a residential or business location. Additionally, although only a single personal computer 135, telephone 140, and television 145 are shown in FIG. 1, it can be appreciated that any particular customer premises 130 may have any number (including none) of any of these devices. Further, although a single customer premises 130 is shown in FIG. 1, servers devices 120 may typically interact with many customer premises.

Figure 2:
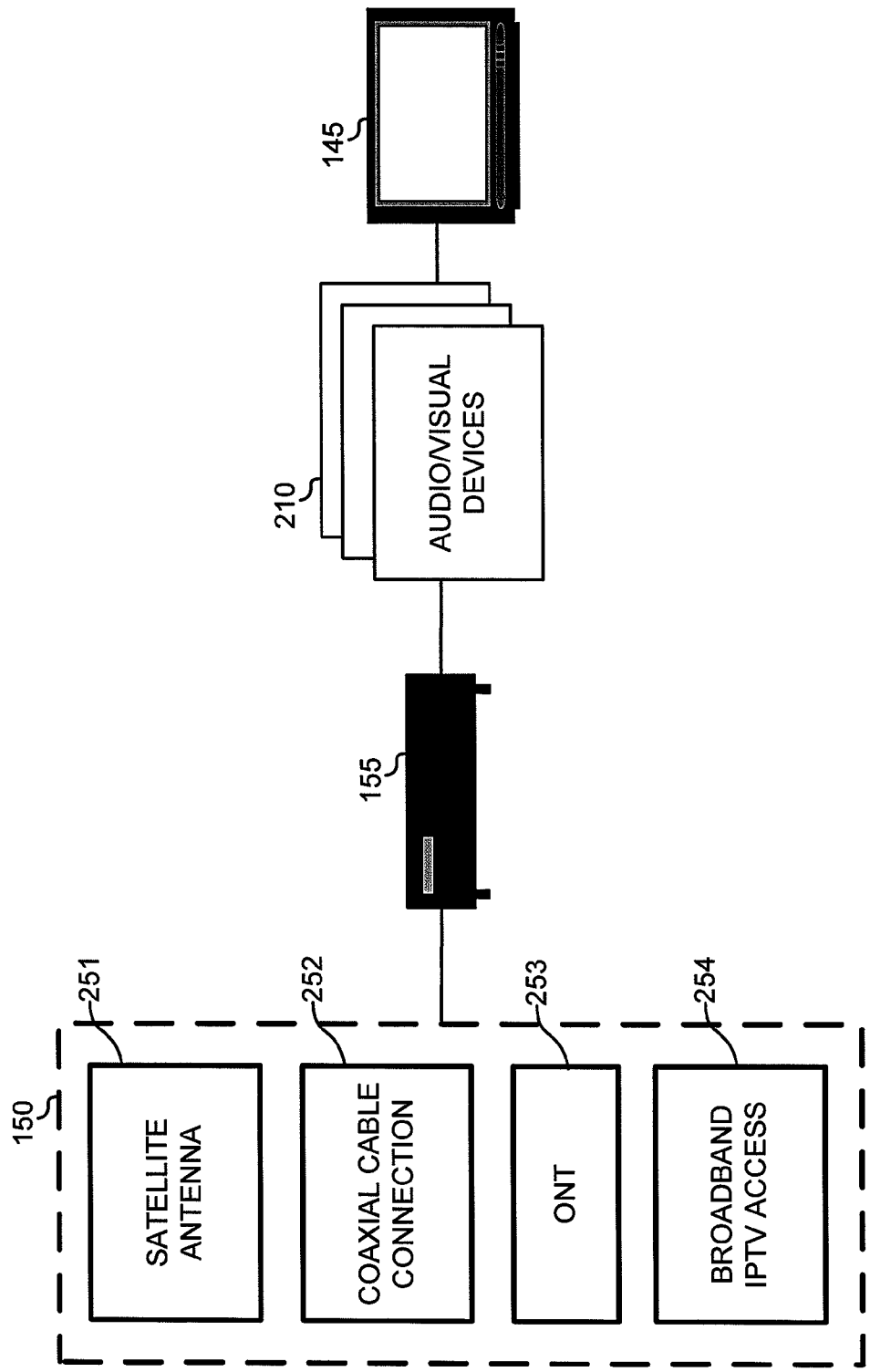
FIG. 2 is diagram illustrating exemplary components relating to a television and set-top box in additional detail.

FIG. 2 is diagram illustrating exemplary components relating to television 145 and STB 155 in additional detail. In FIG. 2, television 145 and STB 155 are additionally illustrated as being connected through one or more audio/video (AV) devices 210. AV devices 210 may include one or more of, for example, audio/video receivers, video amplifiers, video switches, videocassette recorders (VCRs), or digital video disc (DVD) players. In general, AV devices 210 may represent any audio or video equipment that a customer installs to provide additional audio/video capabilities or to enhance the capabilities of existing equipment.

In FIG. 2, gateway 150 is more particularly shown as including one of a number of possible gateway devices, including satellite antenna 251, coaxial cable connection 252, ONT 253, or broadband access for Internet protocol TV (IPTV) 254. Satellite antenna and receiver 251 may provide an interface for television service broadcast from satellites. Coaxial cable connection 252 may provide an interface for television service connected to a consumer via coaxial cables. ONT 253 may provide an interface for an optical fiber connection. Broadband IPTV access 254 may generally include any device that provides broadband access over which television service may be provided.

Figure 3:
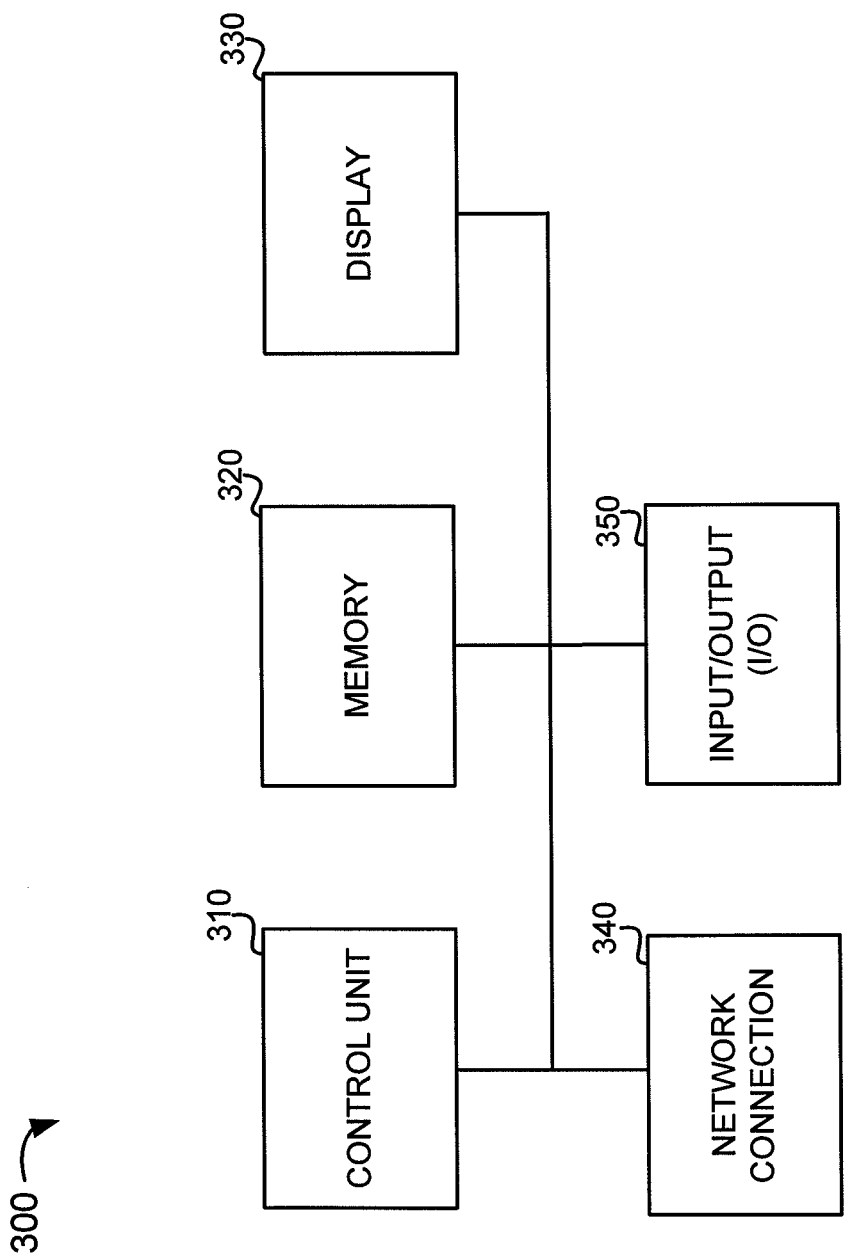
FIG. 3 is a diagram illustrating an exemplary implementation of a processing device, such as one of the devices shown in FIGS. 1 and 2.

FIG. 3 is a diagram illustrating an exemplary implementation of a processing device 300, such as one of server 120, computing device 135, STB 155, local gateway 150, or AV devices 210. Processing device 300 may include control unit 310, memory 320, display 330, network connection 340, and input/output (I/O) device 350.

Control unit 310 may include a processor, microprocessor, or other type of processing logic that may interpret and execute instructions. Memory 320 may include a dynamic or static storage device that may store information and instructions for execution by control unit 310. For example, memory 320 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Display 330 may include any component capable of providing visual information. For example, in one implementation, display 330 may be a liquid crystal display (LCD). In another implementation, display 330 may be any one of other display technologies, such as a plasma display panel (PDP), a field emission display (FED), a thin film transistor (TFT) display, etc. Display 330 may display, for example, text, image, and/or video information. Display 330 may be an optional component. In some implementations of device 300, such as when device 300 represents server devices 120 or gateway 150, a display may not be used.

Network connection 340 may include any transceiver-like mechanism that enables device 300 to communicate with other devices and/or systems. For example, network connection 340 may include an Ethernet interface, an optical interface, a coaxial interface, a radio interface, or the like. Network connection 340 may allow for wired, wireless, and/or optical communication. Network connection 340 may be particularly configured to connect device 300 to a packet-based IP network.

Input/output devices 350 may generally include user input devices such as external buttons, a keyboard or mouse and output devices such as a printer. With input/output devices 350, a user may generally interact with device 300. In some implementations, device 300 may be a "headless" device, in which case input/output devices 350 (and display 330) may be absent. When device 300 is a device as such set-top box 155, input/output device 350 may particularly be implemented as a remote control.

As will be described in detail below, device 300 may perform certain operations relating to testing of audio/video equipment. In this situation, device 300 may particularly represent STB 155. Device 300 may perform these operations in response to control unit 310 executing software instructions contained in a computer-readable medium, such as memory 320. A computer-readable medium may be defined as a physical or logical memory device.

The software instructions may be read into memory 320 from another computer-readable medium or from another device. The software instructions contained in memory 320 may cause control unit 310 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of device 300, in other implementations, device 300 may include fewer, additional, and/or different components than those depicted in FIG. 3. In still other implementations, one or more components of device 300 may perform one or more other tasks described as being performed by one or more other components of device 300.

Figure 4:
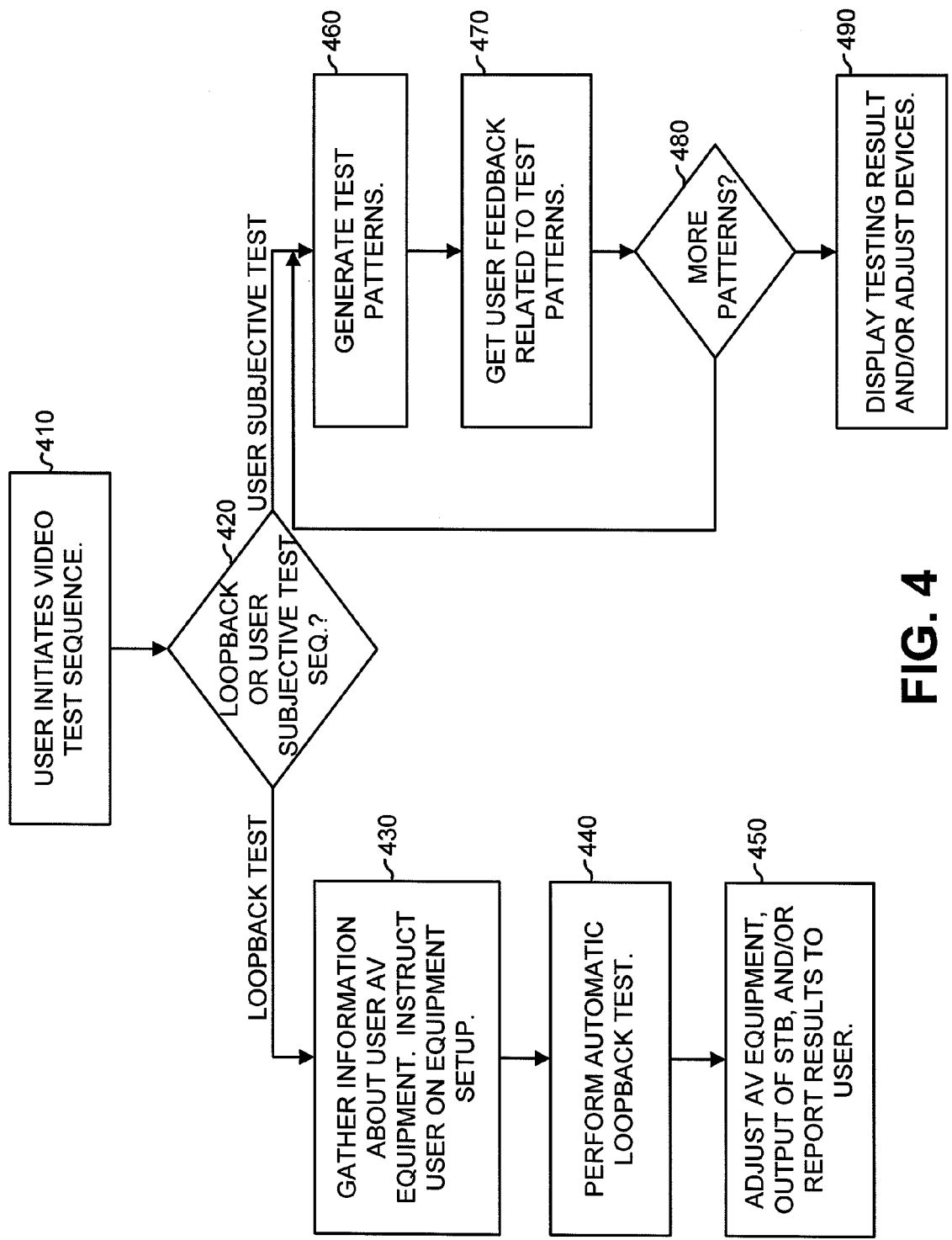
FIG. 4 is a flow chart illustrating exemplary operations for allowing television consumers to automatically test and potentially adjust the quality of a received video signal.

FIG. 4 is a flow chart illustrating exemplary operations for allowing a consumer/customer to automatically test and potentially adjust the quality of a received video signal.

At some point, a user may decide to test and/or adjust the quality of his/her video signal, such as the quality of the signal output/displayed on television 145. For example, a consumer may, for instance, when initially setting up an audio/video system or when adding equipment to an audio/video system, decide to test the system. As described herein, STB 155 may assist a customer in testing or adjusting the video signal received on television 145.

When desired, the user may initiate a video test sequence (block 410). The user may initiate the video test sequence by, for example, selecting a video test option via an interface provided by STB 155 and displayed on television 145.

In one implementation, STB 155 may provide multiple different video test techniques from which the user may choose. For example, as shown in FIG. 4, STB 155 may be configured to implement both an automatic test sequence based on a video loopback feed (blocks 430, 440, and 450) or a user subjective test sequence based on the display of video patterns (blocks 460, 470, 480, and 490). STB 155 may allow the user to decide which of these sequences to implement (block 420).

Assume that, in block 420, the user selects the automatic test sequence. In some implementations, STB 155 may initially gather information about the audio/video equipment involved in the user's setup (block 430). For instance, the interface provided by STB 155 may ask the user to enter the make and model of some or all of the user's equipment. STB 155 may query one or more of servers 120 to potentially download information relating to the equipment entered by the user. STB 155 may use this information in determining how to perform the automatic loopback testing. The user may need to adjust the connections of the AV equipment to obtain a loopback connection with the STB. STB 155 may also guide or prompt the user in setting up the loopback connection (block 430). For example, STB 155 may describe which input/output ports to connect for STB 155, AV devices 210, and/or television 145.

STB 155 may next perform the automatic loopback testing (act 440). STB 155 may perform the testing by generating one or more video clips or test patterns. The video clips or test patterns may include, for instance, color bars, detailed images, or color saturated images. The video clips or test patterns may be input to one or more of AV devices 210 and the output of one or more of the AV devices 210 may be input back to STB 155 in a loopback configuration. STB 155 may analyze the signal that enters STB 155 to determine the quality of the signal. STB 155 may, for example, use image and video processing techniques to analyze the color, image sharpness, and other attributes of the signal. Interlaced video signal processing tasks, such as decoding, de-interlacing, motion correction, noise reduction, and detail enhancement may also be evaluated. The analysis may include a comparison of the original video signal transmitted from STB 155 to the loopback version of the video signal received by STB 155. Based on this analysis, STB 155 may determine the quality of the video signal and may also determine, given the AV devices 210 that are in use, whether the video signal could potentially be improved.

Based on the results of the testing performed in block 440, STB 155 may determine that the signal can be improved. STB 155 may then either report the result of the testing to the user or, in some implementations, automatically adjust the user's equipment (block 450). For example, the results may be reported to the user via television 145 or through an external interface, such as by transmitting the results to one of servers 120, which may then make the results available through a web connection. In one implementation, if enabled by AV device 210, STB 155 may automatically adjust configuration options for AV device 210 to adjust the quality of the video signal. In some instances, the user may be notified of the automatic adjustments via information provided on television 145. In some implementations, the user may be asked to approve the adjustments before they are made. In other implementations, STB 155 may internally adjust the video signal output from STB 155 to attempt to compensate for AV device 210. In still other implementations, STB 155 may provide, through television 145, recommendations to the user or an installation technician, who may then manually adjust AV devices 210 and/or television 145.

The operations of blocks 440 and 450 may be iteratively performed until a satisfactory video signal is achieved. For instance, STB 155 may analyze the video signal automatically, adjust settings in AV devices 210, and then query the user to verify that the signal has improved. The process may be repeated until the user is satisfied.

Figure 5:
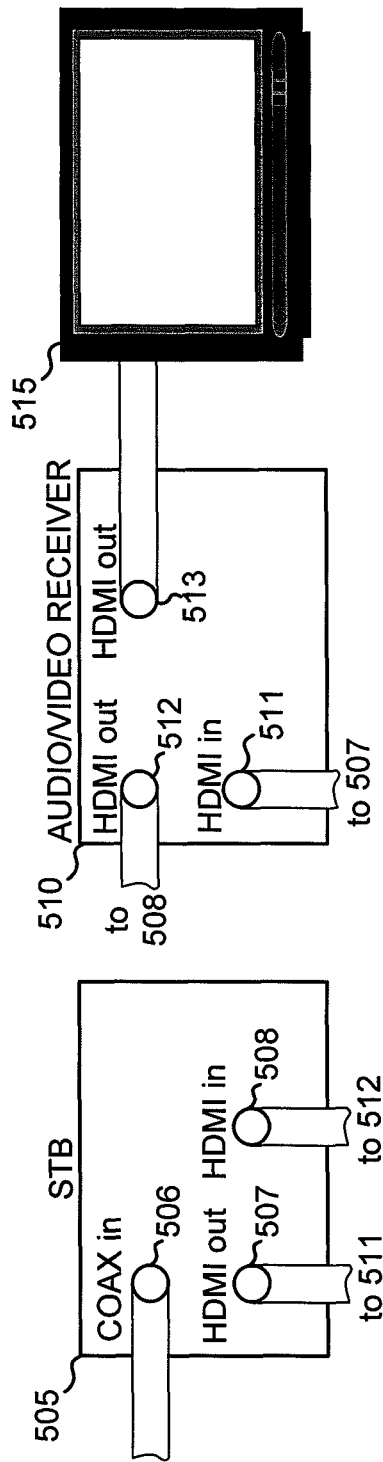
FIG. 5 is a diagram illustrating exemplary audio/video equipment for which a set-top box may perform automatic loopback testing.

FIG. 5 is a diagram illustrating an exemplary audio/video equipment for which STB 155 performs automatic loopback testing. As shown in FIG. 5, assume that a user's audio/video equipment includes a STB 505, an audio/video receiver 510, and a HD television 515.

STB 505 may include a number of input and output ports, such as a coaxial video input port 506, an external HDMI (High-Definition Multimedia Interface) video output port 507, and an HDMI video input port 508. Coaxial video input port 506 may be designed to connect to the output of gateway 150. STB 505 may process the raw video signal received at port 506 to generate, for example, a high definition digital video signal. STB 155 may output the high definition digital video signal at output port 507.

In this example, the user has connected audio/video receiver 510 to the output of port 507. Audio/video receiver 510 may also include a number of input and output ports. For instance, as shown, audio/video receiver 510 may include a video input port 511 and two video output ports 512 and 513. Although in this example ports 511 through 513 are labeled as HDMI ports, it can be appreciated that other types of ports, such as DVI (digital video interface) ports, could alternatively be used.

Output port 512 of audio/video receiver 510 may be connected back to STB 505 to form a loopback connection. In this manner, video output from STB 505 will be processed by audio/video receiver 510 before being transmitted back to STB 505. The user may connect the output of port 512 to STB 505 (e.g., to port 508) in response to a prompt from STB 505 requesting that STB 505 be setup in a loopback configuration with audio/video receiver 510. As shown in FIG. 5, another output port from audio/video receiver, output port 513, may be connected to television 515, potentially allowing the user to view the video signal being tested. The second connection to television 515 may, however, not be necessary for performance of the loopback test.

As previously mentioned, when STB 505 is performing the loopback testing (block 440), STB 505 may output one or more known video test patterns to audio/video receiver 510. STB 505 may then analyze the video signal received back from audio/video receiver 510. STB 505 may, for instance, use image and video processing techniques to examine, for example, the color, image sharpness, and other attributes of the video received from audio/video receiver 510. STB 505 may compare these attributes to an expected "optimal" version of the video signal. Parameters of STB 505, audio/video receiver 510, and television 515 may then potentially be adjusted to improve the video signal.

Referring back to FIG. 4, assume that the user chooses to perform the user subjective test sequence (block 420). In this case, STB 505 may generate a series of test patterns and ask the user to evaluate each pattern (blocks 460 and 470). For example, STB 505 may generate an image including different color vertical bars and ask the user to rate the color uniformity and edge sharpness of each bar. Other possible test patterns include, without limitation, waving flags, images with a lot of detail, or color saturated images. In some implementations, STB 505 may adjust the next pattern in the series of test patterns based on the user evaluations.

As an example of blocks 460 and 470, assume, in FIG. 5, that STB 505 generates a test pattern at video output port 507. The video signal, after processing by audio/video equipment (e.g., audio/video receiver 510) in the path of the video signal, may be displayed on television 515. The user may then evaluate the signal based on the criteria provided by the user interface of STB 505 and provide feedback via, for example, text input or other input. The feedback may be provided, for instance, through user interaction with STB 505 with a remote.

Blocks 460 and 470 may be repeated for a number of different patterns (block 480). Different patterns may be designed to test different aspects of the displayed video signal.

The result of the testing may be displayed to the user or, in some implementations, used to automatically adjust STB 155, AV devices 210, and/or television 145 (block 490). For instance, if enabled by AV devices 210, STB 155 may automatically adjust configuration options for AV devices 210 to adjust the quality of the video signal. In other implementations, STB 155 may internally adjust the video signal output from STB 155 to attempt to compensate for AV devices 210. In still other implementations, STB 155 may provide, through television 145, recommendations to the user, who may then manually adjust AV devices 210 or television 145.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks and/or acts have been described with regard to the process illustrated in FIG. 4, the order of the acts and/or blocks may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed is:

1. A device comprising:
    a video output port; and
    one or more processors to:
        receive, from a user, information associated with at least one of a television device or one or more external audio or video devices associated with the television device;
        download additional information relating to the information associated with the at least one of the one or more external audio or video devices or the television device;
        perform a test based on the additional information,
            when performing the test, the one or more processors are to:
                generate a television signal suitable to be displayed on a display of the television device,
                output the television signal via the video output port to the one or more external audio or video devices associated with the television device,
                receive a loopback version of the television signal from the one or more external audio or video devices, and
                analyze the loopback version of the television signal to determine a result of the test; and
        provide information associated with the result of the test for presentation on the display of the television device or to be available through a web connection.

2. The device of claim 1, where, when analyzing the loopback signal, the one or more processors are to:
    compare the loopback version of the television signal to the output television signal.

3. The device of claim 1, where the television signal includes one or more video test patterns.

4. The device of claim 1, where the one or more processors are further to:
    automatically adjust, based on the result, video output parameters of the device or the one or more external audio or video devices.

5. The device of claim 1,
    where the one or more processors are to:
        receive feedback from the user relating to the television signal, and where the result is further based on the feedback.

6. The device of claim 1, where the information associated with the result includes information associated with a quality of the output television signal based on the feedback, and
    where, when providing the information associated with the result, the one or more processors are to:
        provide, for presentation, the information associated with the quality of the output television signal on the display of the television device.

7. The device of claim 1,
    where the one or more processors are further to:
        provide directions to the user relating to setting up a connection between the device and the one or more external audio or video devices,
    where, when receiving the loopback version of the television signal, the one or more processors are to:
        receive the loopback version of the television signal from the one or more external audio or video devices via the connection.

8. The device of claim 1, where, when providing information associated with the result, the one or more processors are to:
    generate a new television signal based on the result, and
    output the new television signal via the video output port to the one or more external audio or video devices,
        the one or more external audio or video devices presenting, based on the new television signal, the result on the display of the television device.

9. The device of claim 1, where, when providing information associated with the result, the one or more processors are to:
    provide, for presentation, based on the result and on the display of the television device, recommendations for adjusting one or more settings of the one or more external audio or video devices or the television device.

10. A method comprising:
    receiving, by a set-top box and from a user, information associated with at least one of a television device or one or more external devices associated with the television device;
    downloading, by the set-top box, additional information relating to the information associated with the one or more external devices or the television device;
    receiving, by the set-top box, a user selection of whether to perform a test using an automatic loopback test sequence or a user subjective test sequence;
    performing, based on the additional information and when the automatic loopback test sequence is selected, the test that includes:
        transmitting a signal to the one or more external devices,
        receiving a loopback version of the signal from the one or more external devices, comparing the received loopback version of the signal to the transmitted signal, and
determining a result of the test based on the comparing of the received loopback version of the signal to the transmitted signal;
performing, by the set-top box and when the user subjective test sequence is selected, the test that includes:
providing, for presentation, one or more test patterns on a display of the television device,
receiving, from the user, feedback relating to a quality of the one or more test patterns, and
determining the result of the test based on the feedback; and
providing, by the set-top box, information associated with the result.

11. The method of claim 10, where displaying the one or more test patterns includes:
transmitting the test patterns to the one or more external devices,
the one or more external devices displaying the test patterns on the display of the television device.

12. The method of claim 10, where providing the information associated with the result includes:
providing, for presentation, on the display of the television device, the information associated with the result.

13. The method of claim 10, where transmitting the signal includes:
transmitting the one or more test patterns to the one or more external devices.

14. The method of claim 10, further comprising:
automatically adjusting, based on the result of the test, video output parameters of the set-top box.

15. The method of claim 10, further comprising:
adjusting, based on the result of the test, video output parameters of the one or more external devices.

16. The method of claim 10, further comprising:
providing directions to the user relating to setting up connections between the set-top box and the one or more external devices.

17. The method of claim 10, further comprising:
determining one or more adjustments for the one or more external devices based on the result,
receiving, from the user, approval to make the one or more adjustments, and
making the one or more adjustments after receiving the approval.

18. A non-transitory computer-readable medium storing instructions, the instructions comprising:
one or more instructions that, when executed by at least one processor, cause the at least one processor to:
receive, from a user, information associated with at least one of a television device or one or more external devices associated with the television device,
retrieve, from one or more servers, additional information relating to the information associated with the at least one of the one or more external devices or the television device,
generate one or more test patterns for output to the one or more external devices,
output the one or more test patterns to the one or more devices based on the additional information,
receive a loopback version of the one or more test patterns from the one or more external devices,
compare the loopback version of the one or more test patterns to the outputted one or more test patterns to obtain results relating to video quality, and
provide information associated with the results for presentation on a display of the television device or to be available through a web connection.

19. The non-transitory computer-readable medium of claim 18, where the instructions further comprise:
one or more instructions that, when executed by the at least one processor, cause the at least one processor to:
receive feedback from a user relating to the one or more test patterns as displayed by the one or more external devices, and
determine the results based on the comparing and the feedback.

20. The non-transitory computer-readable medium of claim 18, where the instructions further comprise:
one or more instructions that, when executed by the at least one processor, cause the at least one processor to:
determine a quality of the one or more test patterns based on the comparing, and
determine the results based on the quality.

21. The non-transitory computer-readable medium of claim 18, where the instructions further comprise:
one or more instructions that, when executed by the at least one processor, cause the at least one processor to:
determine adjustments for the one or more external devices based on the results,
the information associated with the results including information regarding the determined adjustments,
receive, from the user, approval to make the adjustments, and
make the adjustments after receiving the approval.

22. The non-transitory computer-readable medium of claim 18, where the instructions further comprise:
one or more instructions that, when executed by the at least one processor, cause the at least one processor to:
provide directions to the user relating to setting up connections between the one or more external devices and a set-top box that includes the at least one processor.

* * * * *